April 20, 1943.    F. A. ARMFIELD    2,316,852
LUBRICATING OIL
Filed Aug. 30, 1941
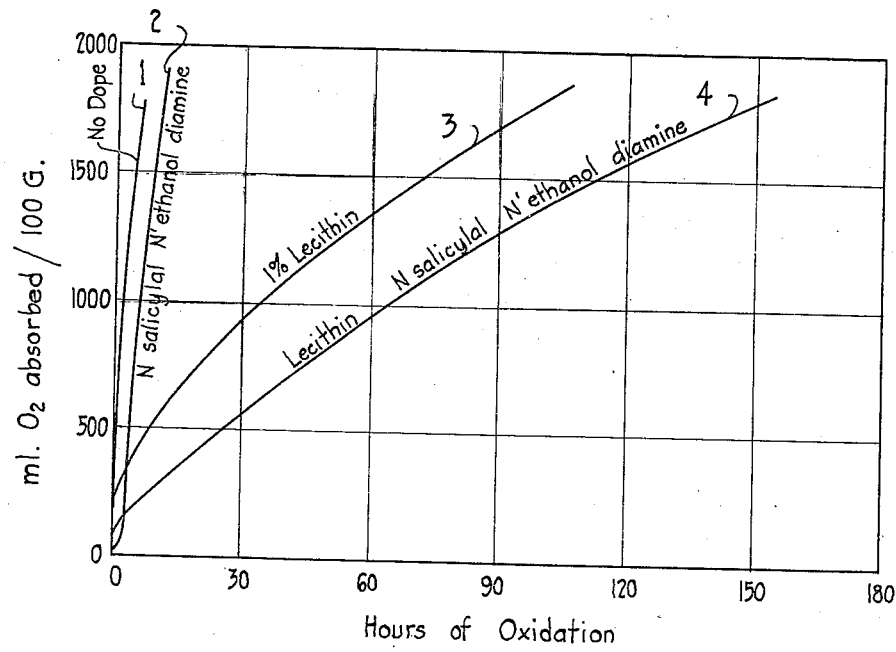
INVENTOR: Frederic A. Armfield.
BY HIS ATTORNEY:

Patented Apr. 20, 1943

2,316,852

UNITED STATES PATENT OFFICE 2,316,852

LUBRICATING OIL

Frederic A. Armfield, Berkeley, Calif., assignor to Shell Development Company, San Francisco, Calif., a corporation of Delaware Application August 30, 1941, Serial No. 409,066

8 Claims. (Cl. 252—51)

This invention relates to the production of new and useful lubricating and electrical oils from suitable hydrocarbon oils by the incorporation of a minor amount of a combination of oil-soluble improving agents. The invention pertains to a method for the stabilization of hydrocarbon oils and particularly to their protection against deterioration by oxidation which is catalyzed by the presence of or by contact with certain oxidation promoters. More particularly, it pertains to lubricating oils containing a phosphatide and a metal deactivator.

It is the purpose of this invention to impart, to hydrocarbon oils normally tending to form sludge upon use, greater resistance to catalytic oxidation which is caused by the sludges or by metals such as copper, iron, chromium, lead and their compounds which may be contained in the sludges.

Hydrocarbon oils normally contact metals and after some period of use frequently contain small amounts of metals, usually associated with sludge, either dissolved in the form of a soluble salt or dispersed in the form of the free metal or an insoluble compound. It has been observed that the presence of such sludges frequently has a detrimental effect on the stability of the hydrocarbon oil. Inasmuch as bare traces of the metals or metal compounds may be very harmful, and since their removal is quite difficult and even if successful would be quickly nullified by the formation of new traces, it is often not practical to eliminate this troublesome catalyst for oxidation reaction. This is true in engines, especially internal combustion engines wherein metal catalysts always tend to become dispersed through wear, corrosion, oxidation, etc.

It has already been suggested to reduce the susceptibility of organic substances to oxidation induced by the presence of certain metals by adding to the organic substance certain deactivators which have the property of rendering the metal inactive. A typical deactivator destroys the effectiveness of the catalyst in the early stages, i. e. creates a prolonged induction period, after which the deactivator is consumed and the catalyzed oxidation proceeds unhindered.

Compounds having metal deactivating properties are for example, oil-soluble heterocyclic nitrogen compounds such as carboxy pyridines, hydroxy pyridines, pyridines having a plurality of acidic radicals, corresponding compounds of quinoline, isoquinoline, acridine, phenanthridine, phenazine, quinoxaline, quinazoline, anthrapyridine, etc.; reaction products of diacyl compounds and primary amines such as dibenzoyl acetonyl ethylene diamine, diacetyl acetonyl ethylene diamine; reaction products of an aromatic ortho-hydroxy aldehyde or ketone with alkylamines or hydroxy alkylamines, such as salicylal ethylamine, salicylal ethanolamine, N salicylal N′ ethanol diamine, disalicylal ethylene diamine; disalicylal triethylenetetramine, di-(2 - hydroxy - 3 - methoxybenzal) - propylene diamine, di - (2 - hydroxy - 5 - chlorobenzal) - diethylenetriamine, di - (2 - hydroxy - 3 - carboxybenzal)-ethylene diamine, etc.; hydroxy aromatic aldoximes and ketoximes such as o-hydroxy-naphthylaldoxime, 2-hydroxy-benzaldoxime, 2-hydroxy-acetophenoxime, etc.

However, it has been observed that, in general deactivators have a markedly reduced effect when added to oils containing sludge or which quickly develop sludge during use.

The instant invention involves the discovery that the action of metal deactivators in oils containing or developing sludge during use is greatly enhanced by the presence of phosphatides such as lecithin. For example, addition of ½% of lecithin to an oil containing ½% of a metal deactivator such as N salicylal N′ ethanol diamine stabilizes the oil and effectively inhibits sludge formation and catalytic oxidation to a greater extent than is obtainable with either 1% of lecithin or 1% of N salicylal N′ ethanol diamine alone.

Although lecithin is preferred for use in accordance with this invention, it is possible to use cephalin and other natural phosphatides of plant or animal origin as, for example, are found in substantial quantities in soybeans, or synthetic products. In either case, the useful products are compounds having the general formula:

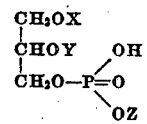

where X and Y are fatty acyl radicals derived from stearic, palmitic, oleic acids, etc., and where Z represents an amino alcohol group. In the case of lecithin the amino alcohol group is choline—$CH_2CH_2N(CH_3)_3OH$.

The amounts of deactivators and phosphatides which may be added may vary between wide limits depending upon specific conditions to be met. The amounts of metal deactivators added to lubricating oils may be as low as .001% by ight, amounts between approximately .01% to 5% being preferred. Where large amounts of talytic metal or metal compounds are conined in the lubricating oil, larger amounts of e deactivator up to 2% may be used.

Addition of as little as .01% by weight of the iosphatides to sludged lubricating oils containg a metal deactivator gives measurable imovement. Generally it is preferable to use in y lubricating oil compositions .05% to 1% by ight of the phosphatide, although amounts up 3% may be utilized, depending upon the stality requirements.

Metal deactivators and phosphatides used in nounts necessary to impart stability to my hyocarbon oil compositions give the best results en employed within a preferred range of relave amounts. Thus it is desirable that the range ratios vary from five parts of phosphatide to e part of deactivator to approximately ten parts phosphatide to one part of deactivator. This eferred ratio of the compounding ingredients based on the relative amounts of the two inedients, irrespective of the total amounts, as scussed hereinbefore, which may be present in e liquid or of other addition agents which may present.

In the following example, the beneficial effect one particular combination of compounds is ustrated. A sample of lubricating oil grade A. E. 30 was divided into four portions. To ch sample was added 3.5 cm.² of iron/surface n. of oil in the form of iron wire. To the first rtion was added 1% by weight of lecithin. To e second portion was added .1% by weight of salicylal N' ethanol diamine. To the third rtion was added the combination 1% by weight lecithin and .1% of N salicylal N' ethanol dinine. The uncompounded and compounded mples were tested by exposing the oils to pure ygen at atmospheric pressure and at a temerature of 150° C. for several hours whereafter sludge was formed. The effect on oxidation ability of oils of the addition of lecithin to an l containing a deactivator is illustrated by the tached drawing representing a graph wherein e length of time in hours of oxidation is plotted abscissa and the mols of oxygen absorbed is otted as ordinate. Four curves are shown, curve representing the rate of oxygen absorption in e absence of any deactivator, curves 2, 3 and 4 presenting the rate of oxygen absorption under lentical conditions in the presence of 1% lecilin, .1% N salicylal N' ethanol diamine and the combination of the individual components, respectively.

It will be seen that the metallic iron was deactivated by the combination for a considerably longer time than could be expected from the sum of the individual effects.

The combination of ingredients of this invention may be used in conjunction with other addition agents, for example, in lubricating oils together with anti-oxidants, blooming agents, anticorrosives, extreme pressure compounds, detergents, etc.

I claim as my invention:

1. The method of inhibiting the catalytic oxidation of a lubricating or electrical oil caused by sludge containing a catalyst of the group consisting of copper, iron, chromium, lead, and their compounds which comprises incorporating in said hydrocarbon oil a small amount each of a phosphatide and a metal deactivator selected from the class consisting of the reaction products of a primary amine and a beta carbonyl compound, the latter being selected from the group consisting of aliphatic diacyl and aromatic o-hydroxy carbonyl compounds.

2. A lubricating composition comprising a refined mineral lubricating oil, subject to sludge formation through activated oxidation caused by the presence of a member of the group consisting of copper, iron, chromium, lead, and their compounds, and containing small amounts each of a phosphatide and a metal deactivator selected from the class consisting of the reaction products of a primary amine and a beta carbonyl compound, the latter being selected from the group consisting of aliphatic diacyl and aromatic o-hydroxy carbonyl compounds.

3. The composition of claim 2, which contains .01 to 3.0% by weight of the phosphatide and .001 to 2% of the metal deactivator.

4. The composition of claim 2 which contains .05 to 1.0% by weight of the phosphatide and .01 to .15% of the metal deactivator.

5. The composition of claim 2 in which the ratio of amounts of phosphatide to metal deactivator is between 5 and 10 to 1.

6. The method of claim 1, wherein the phosphatide is lecithin.

7. The method of claim 1, wherein the phosphatide is lecithin and the deactivator is N-salicylal N' ethanol diamine.

8. The composition of claim 2, wherein the deactivator is di-salicylal ethylene diamine.

FREDERIC A. ARMFIELD.